United States Patent

Belvedere

[11] Patent Number: 5,988,192
[45] Date of Patent: Nov. 23, 1999

[54] SOAKING CASKS FOR MALTHOUSES

[75] Inventor: Francesco Belvedere, Madrid, Spain

[73] Assignee: Seeger Industrial, S.A., Madrid, Spain

[21] Appl. No.: 09/054,817

[22] Filed: Apr. 3, 1998

[30] Foreign Application Priority Data

Apr. 4, 1997 [ES] Spain ..................................... 9700707

[51] Int. Cl.$^6$ .................................................. B08B 3/04
[52] U.S. Cl. .................................. 134/166 R; 134/104.1; 134/115 R; 134/201
[58] Field of Search ........................... 134/166 R, 104.1, 134/115 R, 201; 210/498, 499; 366/138; 209/380

[56] References Cited

U.S. PATENT DOCUMENTS

| | | | |
|---|---|---|---|
| 161,708 | 4/1875 | Schafhaus | 366/138 |
| 515,618 | 2/1894 | Saladin | 134/201 |
| 1,148,087 | 7/1915 | Harless | 134/201 |
| 1,938,254 | 12/1933 | Hinson | 134/201 |
| 3,291,144 | 12/1966 | Diamond | 134/104 |
| 3,961,637 | 6/1976 | Owen | 134/65 |
| 4,243,431 | 1/1981 | Dingler | 134/104 |
| 4,390,034 | 6/1983 | Bes | 134/104 |
| 4,667,420 | 5/1987 | Amelung | 34/241 |
| 5,127,416 | 7/1992 | Wakabayashi | 134/104.1 |

*Primary Examiner*—Frankie L. Stinson
*Assistant Examiner*—Mialeeka C. Williams-Bibbs
*Attorney, Agent, or Firm*—Helfgott & Karas, PC

[57] ABSTRACT

They consist in the arrangement, as bottom of the cask (1), of a pluri-grooved sheet (7) which defines a plurality of cylindrical grooves, laterally adjacent and with coplanar mouths, the width of said grooves (7), being at a level with its mouth, corresponding with the spacing between the beams (3) which constitute the supporting structure for the false grated bottom (2), permitting that said supporting structure (3) be outside the receptacle (1), abutting in the first place, on the upper edge of the beams (3) which constitute the same, flat facets (8) of the pluri-grooved sheet (7) which separate the different grooves (7-7') of the same, and immediately on said facets, the marginal zones of the grated modules (2). In this manner, the structure (3), which supports the bottom and the false bottom, is not affected by the soaking or germination processes produced in the inside of the cask, and the cleaning of the chambers (9-9') defined between the bottom (7) and the false bottom (2) becomes comfortable and simple, specifically by the provision of water through the tubes (10) which longitudinally runs through the chambers (9), in sensibly centered arrangement and which counts with radial nozzles for the spraying of the water.

3 Claims, 2 Drawing Sheets

SOAKING CASKS FOR MALTHOUSES

DESCRIPTION

OBJECT OF THE INVENTION

The present invention refers to a series of improvements introduced in soaking casks, of the ones used in malthouses, said improvements being directed towards facilitating in a very considerable manner, the cleaning process of the same, even permitting that the cleaning be automatic.

BACKGROUND OF THE INVENTION

As is known, the casks for performing the soaking or germination operations in malthouses, generally adopt a cylindrical configuration, with vertical axis, provided with a false perforated bottom, on which the grain is placed, specifically, barley, in the hollow of which, a series of turning elements act, as for example, lead screws, establishing between said false grated bottom and the real bottom of the cask, a lower chamber in which, on the one hand, the supporting structure of the grating modules are located, whilst, on the other hand it acts as chamber through which, on occasions water, and on other occasions air, etc, is provided to the mass of the product.

Though the false grated bottom does not permit the grains to penetrate to the lower chamber, residues of organic material undoubtedly penetrate, which in a propitious environment existing in said chamber, facilitate the proliferation of bacteria and micro-organisms which are capable of being dragged towards the mass of the product and which are substantially detrimental to the latter, transmitting bad smells, among other possible problems.

This supposes, that said lower chamber of the soaking and germination casks must be periodically subjected to an appropriate cleaning to prevent the described problem.

Up to now, the cleaning operations were conducted manually, lifting the grating which constitutes the false bottom of the cask and acting directly on the real bottom and on all the interior supporting structure of the grating, which involves a complex and hard task, especially considering the large dimensions of said casks which might well have diameters over 15 meters and in which the gratings are intended to support very important loads, due to which they must be structurally robust and consequently heavy.

Additionally, the structure supporting said gratings is permanently subjected to an environment which is detrimental to the metallic materials from which the same are obtained, creating maintenance problems and shortening their service life.

DESCRIPTION OF THE INVENTION

The improvements proposed by the invention have been conceived in order to solve in a totally satisfactory manner, the previously indicated problem, in the two described aspects.

To achieve this, and in a more specific manner, the improvements of the invention are centered on the replacement of the classical real bottom of the cask by a pluri-grooved sheet the grooves of which dimensionally coincide in width with the beams which constitute the structure which supports the false grated bottom, in such a manner, that the grooves of said sheet are constructed to each other, through their mouth, by means of flat facets, dimensionally in accordance with the top wing of the beams (generally in double-T shape), achieving a perfect abutment of the pluri-grooved sheet on the beams of the structure and the grating modules abutting on said beams, through the flat facets of the pluri-grooved sheet.

In this manner it is obtained on the one hand, that the supporting structure be totally independent from the receptacle of the cask, specifically independent from the lower chamber in which it is generally and conventionally housed, permanently remaining in a dry environment which prolongs very considerably its service life and minimizes its maintenance, whilst, on the other hand said lower chamber remains divided into compartments in independent sub-chambers, with circular sector shaped cross section, which does not offer more than one cylindrical surface corresponding to the actual grating, due to which, its cleaning is quite easy.

Also, the volumetry of said sub-chamber, in their totality, is considerably less than that of the classical chamber, with which a substantial saving of water is achieved in the soaking process.

In accordance with another of the improvements of the invention, it has been provided that in each one of said sub-chambers, a washing tube, centered and longitudinal, is established, equipped with appropriately distributed spraying nozzles, with the particularity, that said tube is rotationally assembled in the hollow of the corresponding chamber, in such a manner, that it conducts, parallel to the projection of water, a sweep which ensures optimum cleaning conditions. This special washing system permits, as has been previously indicated, and as is, on the other hand, obvious, that the washing is automatically produced, only having to activate a simple switch, or even depending on a time switch.

Logically, each one of the sectors of the sheet which constitutes the bottom of the cask, which determines one of the previously indicated sub-chambers, shall be provided in an appropriate location, as for example, in the center of a porthole to evacuate the washing water, with the provision as regards this, that the portholes corresponding to all the sub-chambers be distributed in alignment in order to place under the same a collection channel for the washing water. As is also evident, said sub-chambers shall be appropriately locked by any appropriate conventional means, in correspondence with the ends of the respective grooves which configurate the same.

DESCRIPTION OF THE DRAWINGS

In order to complement the description which is being conducted, and with the object of helping to a better understanding of the characteristics of the invention, according to a preferred embodiment example of the same, a set of drawings is enclosed forming integral part of said description, in which, with illustrative and non limitative character, the following has been represented.

PREFERRED EMBODIMENT OF THE INVENTION

Figure 1:
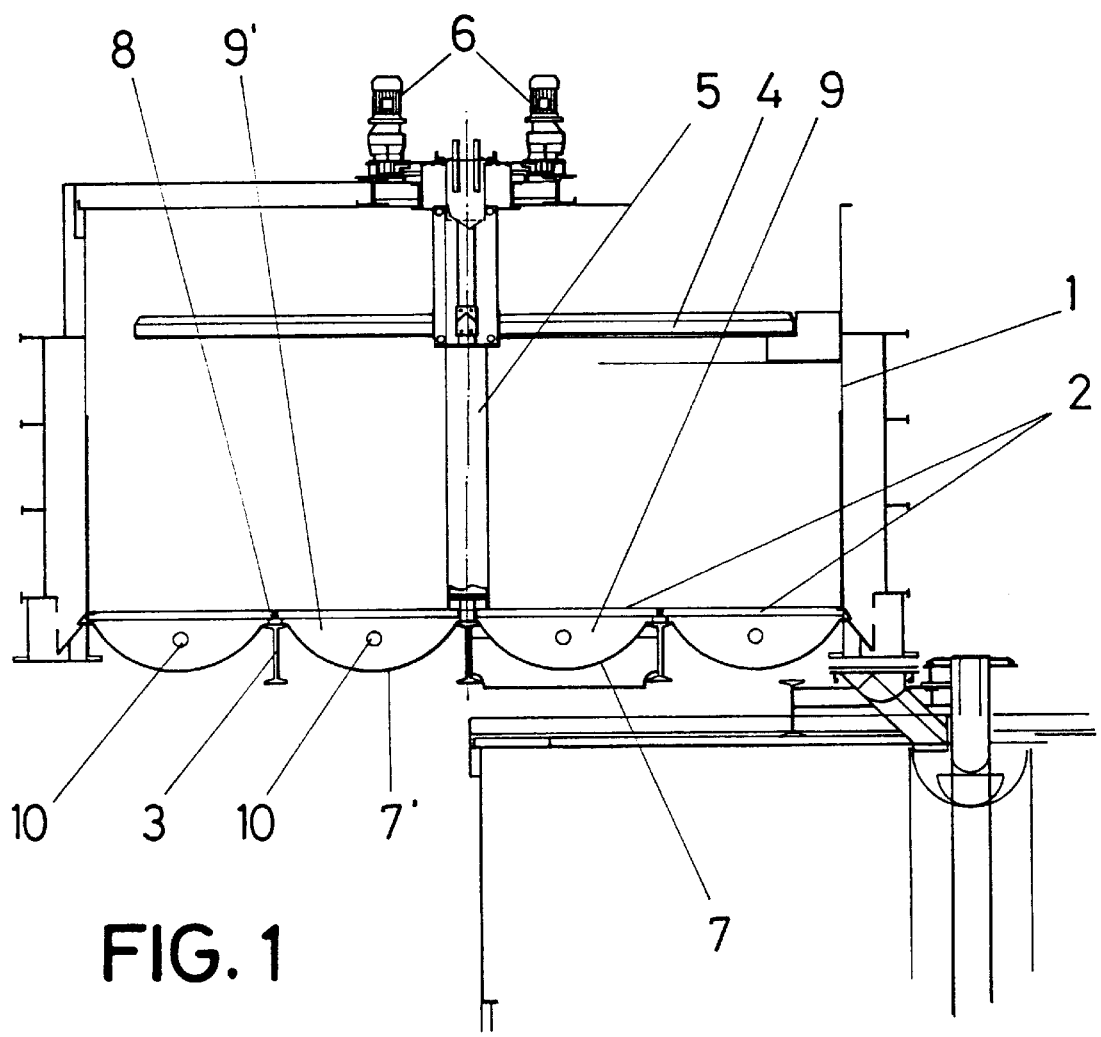
FIG. 1, shows a side elevational, exploded representation, in diametral section of a soaking cask, embodied according to the improvements which are the object of the present invention.

In view of said figures, and more specifically, of FIG. 1, it may be observed how the improvements proposed by the invention are applicable to casks of those used in malthouses, provided with a cylindrical body (1), with very considerable diameter, in which a false bottom is established, based on a plurality of grated modules (2), conveniently supported in horizontal position by a strong structure (3), generally based on Double-"T" shaped beams, all the grating (2) modules being conveniently perforated to permit the passage of air and water, and to prevent in turn, the passage of the barley grains, which are distributed in the hollow of the cask (1) by means of appropriate elements, as for example arms (4) assembled, radially or diametrically on an axial column (5) and conveniently activated by means of motors (6).

Well then, parting form said basic and conventional structure, the improvements of the invention are centered in the fact that the real bottom of the cask, placed below the false grated bottom (2), is constructed of a pluri-grooved sheet (7) material, in such a manner, that the different grooves (7), (7') . . . established on the same, coincide in width with the spacing between the beams (3) which constitute the strong structure, said beams remaining below the sheet (7), as is especially observed in FIG. 1, and in consequence, remaining on the outside of the cask, resulting to be totally independent to the process or processes to be developed in its inteiror.

In a more specific manner, in the pluri-grooved sheet (7) arched sections (7), (7') . . . are defined, with top concave shape which are related to each other by means of short flat facets (8), constitutive of the abutment zones on the beams (3), in such a manner, that between each groove (7-7') of said sheet and the corresponding grating modules (2), sub-chambers (9) (9') . . . are defined . . . through which water, air etc, can penetrate, as is conventional and mandatory, into the cask, which is necessary for the soaking process.

In accordance with this structurization, not only does the structure (3) which supports the bottom of the cask (1) remain placed on the outside of the latter, and in consequence is independent from the processes conducted in said cask, but also, the sub-chambers (9) present a smooth and continuous surface, where the sedimentation of residues in which bacteria and other types of germs might proliferate, is made difficult, and it additionally results to be easier to clean, without requiring that an operator have direct access to said chambers, as conventionally happens, due to the implantation at each one of the same of a longitudinal tube (10), in sensibly centered arrangement, provided with radial nozzels and moved by a rotational movement, during the washing, so that the water jets conduct a sweep throughout all the surface of the corresponding sub-chamber (9), ensuring a perfect washing of the same.

Figure 2:
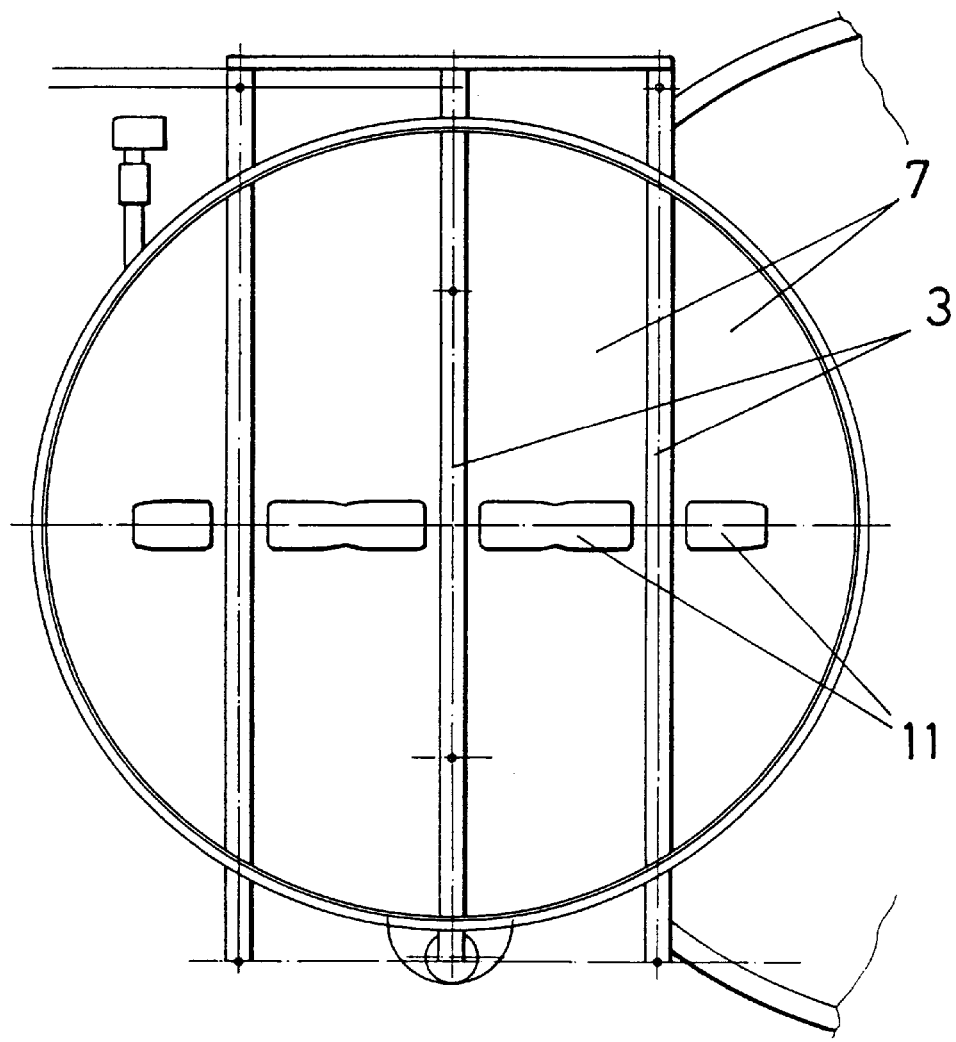
FIG. 2 finally shows, an exploded lower plan representation of the cask, represented in the previous figure.

The washing water is collected by the actual pluri-grooved sheet (7) and emerges on the outside through portholes (11) provided with locking means which make then unusable except during the washing phase, placed at the bottom of each one of the sub-chambers (9), said portholes being aligned, such as is especially observed in FIG. 2 to facilitate the collection of the water, for example by means of a lower channel which is not represented.

It is not considered necessary to make this description more extensive in order that any expert in the Art may understand the scope of the invention and the advantages derived from the same.

The materials, shape, size and arrangement of the elements shall be capable of variation provided this does not suppose an alteration of the essentiality of the invention.

The terms in which this Specification has been written, shall always be taken in the wide and non limitative sense.

I claim:

1. Improvements introduced in soaking casks for malthouses, of the type which are provided with a cylindrical body (1) in the hollow of which is established a bottom (7), and a false grated bottom (2), the false grated bottom (2) retains the mass of a product contained in the cask, between the bottom and the false grated bottom a chamber is established for the provision of water, air or other additives to the cask, characterized in that said bottom (7) of the cask is constructed of pluri-grooved sheet material, based on a plurality of curvo-concave sectors (7-7') the width of which, at the level of its mouth, coincides with the spacing between the beams (3) which constitute the structure supporting the false grated bottom (2) of the cask, establishing between each pair of adjacent grooves, a narrow flat facet (8), intended for an abutment of the top wing, of the corresponding beam (3), in such a manner, that the beams of the strong structure, remain placed below the bottom (7) of the cask and support gratings of the false grated bottom (2) with the interposition of said flat facets (8) of the bottom.

2. Improvements introduced in soaking casks for malthouses, according to claim 1, characterized in that in the hollow of each one of a plurality of sub-chambers (9-9'), defined between each groove (7-7') of the bottom and the false grated bottom (2), a tube (10) is placed, for feeding a washing water, provided with radial nozzles, having been provided that preferably, said tube (10) be moved with a rotational movement, in order that a plurality of washing nozzles conduct a perimetral sweep over a wall of the corresponding sub-chamber (9), which improves washing conditions.

3. Improvements introduced in soaking casks for malthouses, according to claim 1 or claim 2, wherein each grooved sector (7-7') of a sheet which constitutes a closed bottom of the cask, advantageously closed by its ends, includes at a minimum dimensional level, a porthole (11) for the evacuation of the washing water, equipped with locking means, having been provided that a plurality of different portholes (11), corresponding to the various grooves (7-7') are placed in alignment to permit their evacuation on a lower collection channel, which is common to all of the same.

* * * * *